United States Patent
Kerr et al.

(10) Patent No.: US 8,963,803 B2
(45) Date of Patent: Feb. 24, 2015

(54) METHOD FOR SYNCHRONIZING CONTENT DISPLAYED ON MULTIPLE DEVICES IN AN ARRAY

(75) Inventors: Duncan Kerr, San Francisco, CA (US); Daniel T. Preston, San Jose, CA (US); Nicholas V. King, San Jose, CA (US); Ho Chi Andrew Chin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 13/250,052

(22) Filed: Sep. 30, 2011

(65) Prior Publication Data

US 2013/0083240 A1    Apr. 4, 2013

(51) Int. Cl.
*G09G 5/12* (2006.01)
*G06F 3/14* (2006.01)
*H04N 21/41* (2011.01)
*H04N 21/43* (2011.01)
*H04N 21/436* (2011.01)
*H04N 21/4402* (2011.01)
*H04N 21/442* (2011.01)

(52) U.S. Cl.
CPC .......... *G06F 3/1446* (2013.01); *H04N 21/4122* (2013.01); *H04N 21/4302* (2013.01); *H04N 21/436* (2013.01); *H04N 21/4402* (2013.01); *H04N 21/44227* (2013.01)

USPC ................ 345/2.3; 345/1.2; 345/1.3; 345/1.1

(58) Field of Classification Search
USPC .................... 345/1.1, 1.3, 204, 427; 348/383; 353/30; 358/1.12
See application file for complete search history.

(56) References Cited

U.S. PATENT DOCUMENTS

| 6,501,441 B1* | 12/2002 | Ludtke et al. .................. 345/1.1 |
| 7,777,811 B2* | 8/2010 | Kondo .......................... 348/383 |
| 2003/0117344 A1 | 6/2003 | Hine et al. |
| 2009/0160731 A1 | 6/2009 | Schuler et al. |
| 2009/0168088 A1* | 7/2009 | Rosenblatt .................. 358/1.12 |
| 2010/0001923 A1 | 1/2010 | Zilber |

FOREIGN PATENT DOCUMENTS

EP    1550947    7/2005

* cited by examiner

*Primary Examiner* — Ariel Balaoing
*Assistant Examiner* — Sepehr Azari
(74) *Attorney, Agent, or Firm* — Kendall P. Woodruff

(57) ABSTRACT

A method comprising providing multiple video units in an array, playing video content on the video units in a synchronized manner, and detecting when one of the video units is removed from the array. In response to detecting removal of the video unit, the video content played on the video units remaining in the array in a synchronized manner is adjusted.

24 Claims, 8 Drawing Sheets

METHOD FOR SYNCHRONIZING CONTENT DISPLAYED ON MULTIPLE DEVICES IN AN ARRAY

BACKGROUND OF THE INVENTION

The present disclosure relates generally to displaying video content on one or more video units. More particularly, the present disclosure relates to displaying synchronized content on one or more video units arranged in an array to provide a unified experience, and dynamically adjusting content displayed on the video units when a video unit is removed from the array.

The ability to play content on multiple devices has been around for a number years. A "video wall," for example, consists of multiple video units such as computer monitors, video projectors, or television sets tiled together contiguously in order to form a single large screen. Such video walls offer benefits such as the ability to customize tile layouts in addition to greater screen area and pixel density per unit cost. However, the content displayed on video walls, as with other existing tiled display technology, is static in nature. Displayed content is predetermined and the tiled video units are unable to communicate with each other or dynamically adjust the content displayed on one or more of the units, if for example, one or more of the units is removed from the wall.

BRIEF SUMMARY OF THE INVENTION

Embodiments of the invention provide improved methods of playing video content on a video unit, such as the synchronization of video content played on multiple video units in an array, and the displaying of specific video content on a video unit when removed from the array.

In one particular embodiment, multiple video units are provided in an array with each video unit playing video content in a synchronized manner. When removal of one of the video units from the array is detected, the video content played on the video units remaining in the array in a synchronized manner.

In another embodiment, the removal of a first video unit from an array of video units playing video content in a synchronized manner is detected. In response to detecting removal from the array, video content is played on the first video unit that is specific to the first video unit. The video content played on the first video unit is not synchronized with the video content displayed on the video units remaining in the array.

In yet another embodiment of the invention, a base unit is provided on which multiple video units are positioned in an array. The base unit wirelessly powers the video units, and a power signal is manipulated to determine the location of the video units positioned on the base unit.

To better understand the nature and advantages of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout and in which.

DETAILED DESCRIPTION OF THE INVENTION

Embodiments of the present invention pertain to playing video content on one or more video units arranged in an array in a synchronized manner, and dynamically adjusting the video content when a video unit is removed from the array. Embodiments of the invention can dynamically adjust the video content by initiating a new, unsynchronized video on the video unit removed from the display and/or by adjusting the timing of the synchronized video content played on the video units remaining in the array.

As used herein, a "video unit" can include any device that may be used to present video content. Such devices may include, for example, portable music players (e.g., Apple's iPod devices), portable video players (e.g., portable DVD players), smart phones or other cellular phones (e.g., Apple's iPhone devices), projection systems, PDAs, desktop computers (e.g., Apple's iMac devices), laptop computers (e.g., Apple's MacBook devices), tablet or other mobile computers (e.g., Apple's iPad devices), televisions, etc. Some of these devices may also be configured to provide audio or other sensory output.

Figure 1:
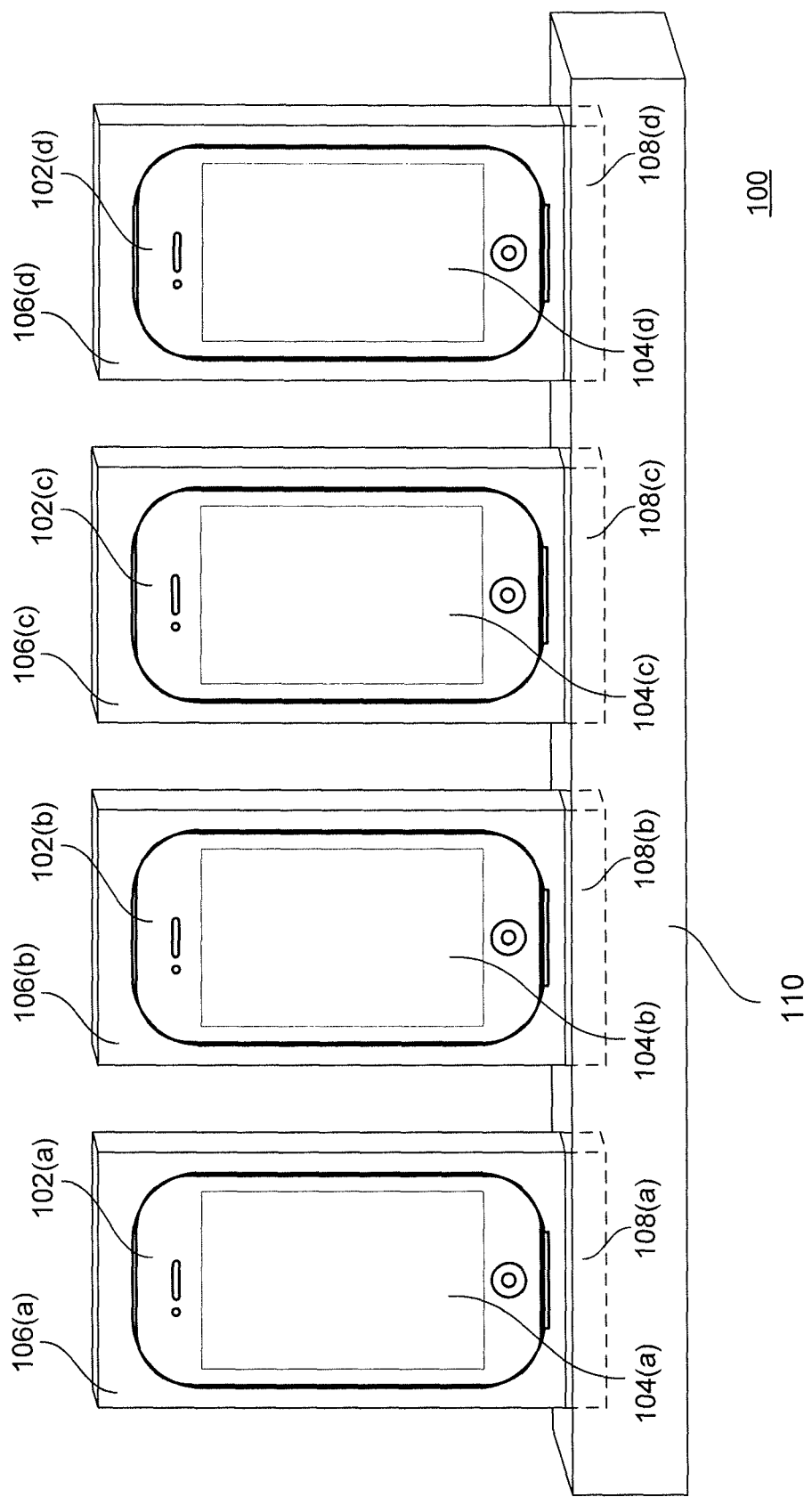
FIG. 1 is a simplified perspective view of a video unit array 100 according to an embodiment of the invention.

FIG. 1 is a simplified perspective view of a video unit array 100 according to an embodiment of the invention. The video unit array 100 can include a row of video units 102(a)-(d) with display screens 104(a)-(d) that may be used to display video content. The video units 102(a)-(c) can be suspended in casings 106(a)-(d) supported by a base unit 110. The base unit 110 can include recesses 108(a)-(d) in which the casings 106(a)-(d) suspending the video units 102(a)-(d) can be positioned. The casings 106(a)-(d) and base unit 110 can be comprised of any suitable material such as cardboard, plastic, metal, a composite, or any combination thereof. Casings 106(a)-(d) can allow for display screens 104(a)-(d) to be visible to an observer. For example, casings 106(a)-(d) can include a transparent (e.g., plastic or glass) window or a "cut-out" portion allowing an observer to view the video content played on display screens 104(a)-(d).

Video units 102(a)-(d), casings 106(a)-(d), and base unit 110 can include hardware configured to charge a battery (not shown) included in video units 102(a)-(d) when casings 106(a)-(d) are positioned in recesses 108(a)-(d) of base unit 110. Base unit 110 can be coupled to a power source and can deliver power to video units 102(a)-(d) using any suitable means such as wireless energy transfer (e.g., inductive coupling, magnetic resonance, etc.) and/or conductive charging (e.g., direct coupling utilizing metallic contacts). Video units 102(a)-(d) can also include a processor and a memory programmed to carry out methods according to various embodiments of the invention.

In an alternative embodiment, video units 102(a)-(d) can be directly supported by base unit 110 when positioned in recesses 108(a)-(d). Video units 102(a)-(d) and base unit 110 can include hardware configured to charge a battery included in video units 102(a)-(d) when positioned in recesses 108(a)-(d) of base unit 110 using any of the charging means described above.

Figure 2:
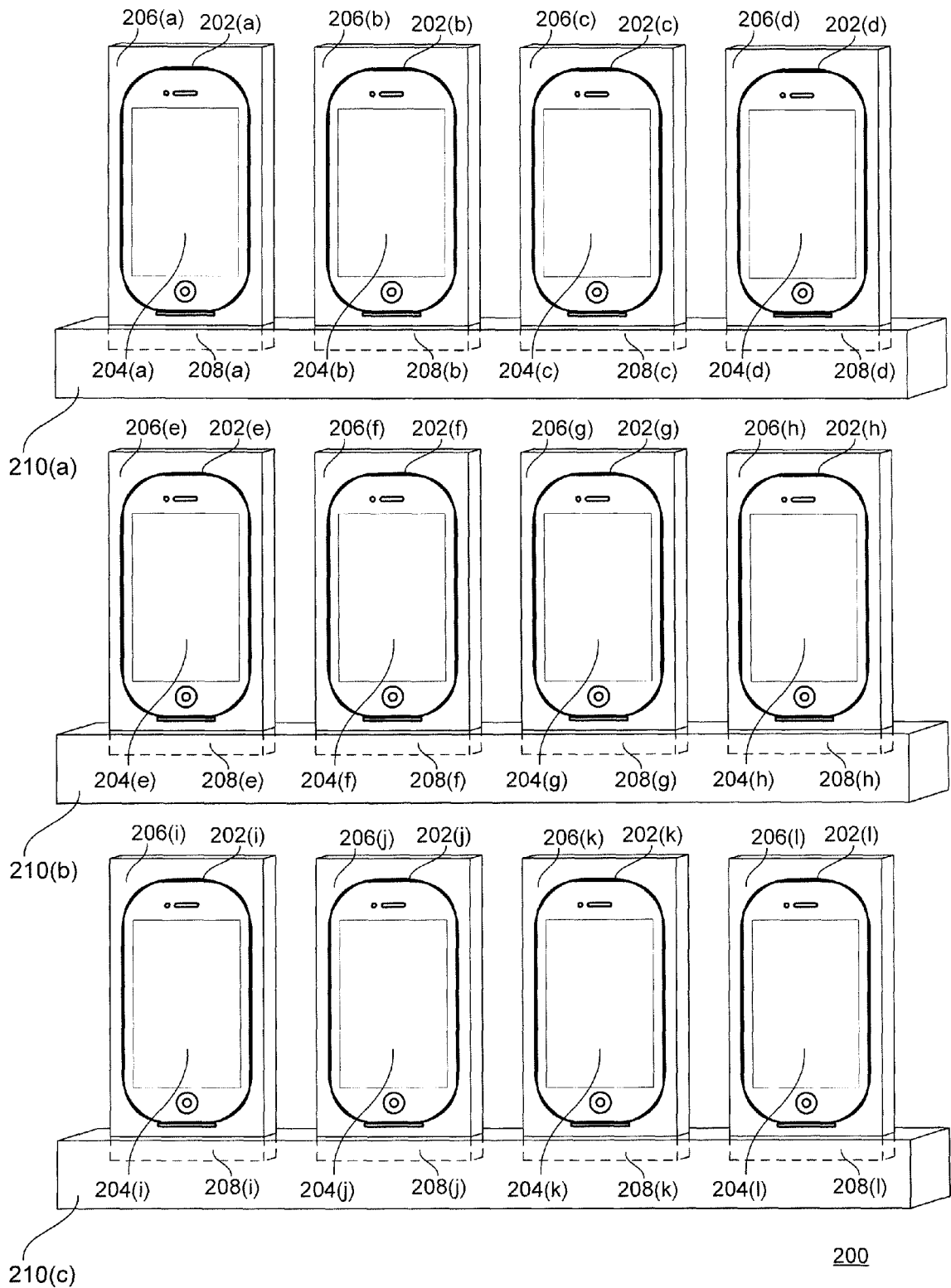
FIG. 2 is a simplified perspective view of a video unit array 200 according to another embodiment of the invention.

As shown in FIG. 2, which is a simplified perspective view of a video unit array 200 according to another embodiment of the invention, video unit array 200 can include multiple rows of video units 202(a)-(l) with display screens 204(a)-(l). Video units 202(a)-(l) can be suspended in casings 206(a)-(l) which can be positioned in recesses 208(a)-(l) in base units 210(a)-(c). Casings 206(a)-(l) and base units 210(a)-(c) can be comprised of any suitable material, as described above. Video units 202(a)-(l), casings 206(a)-(l), and base units 210(a)-(c) can include hardware configured to charge a battery (not shown) included in video units 202(a)-(l) when positioned in recesses 208(a)-(l) of base units 110(a)-(c) using any of the charging means described above.

It should be noted that although FIG. 1 illustrates a single base unit supporting four video units and FIG. 2 illustrates three base units each supporting four video units, video unit arrays in embodiments of the invention can include any number of base units and video units in any suitable combination. For example, video units and base units can be arranged in a 3-dimensional array having depth such that a moving object, for example, can be displayed on the video units in a synchronized manner. In such an arrangement, the moving object can appear to an observer to "move" up, down, and across the video unit array as well as back and forth across its depth. Additionally, in some embodiments of the invention, casings are not required, and video units can instead be positioned directly into a base unit to display synchronized video content.

Figure 3A:
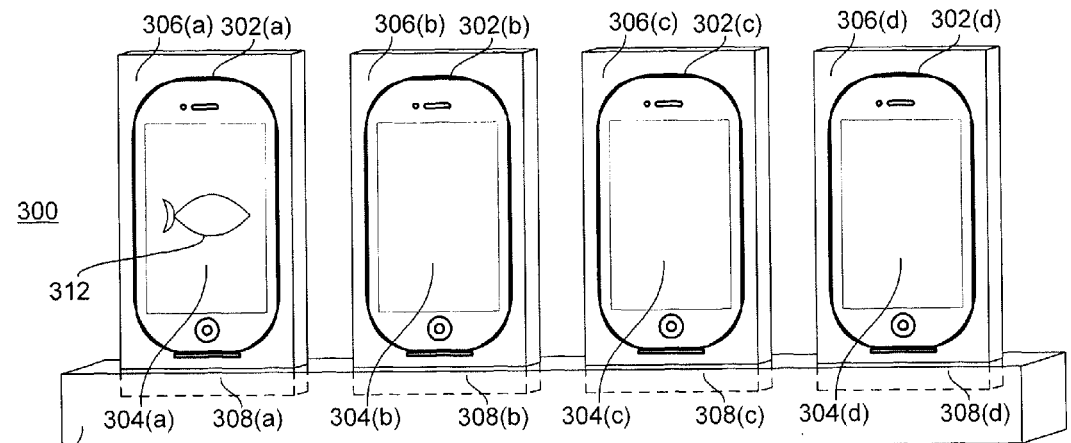
FIGS. 3A-3C are simplified perspective views of a video unit array 300 with video units playing video content in a synchronized manner according to an embodiment of the invention.
Figure 3B:
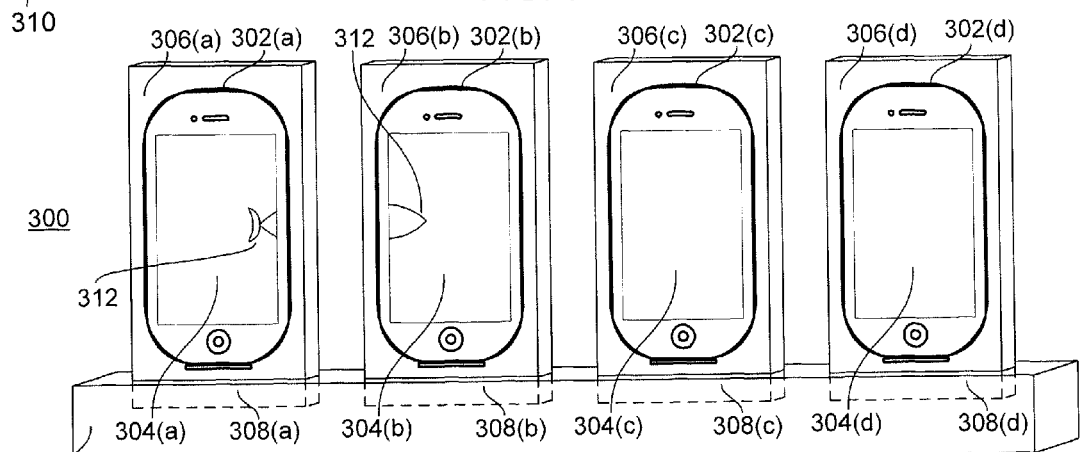
Figure 3C:
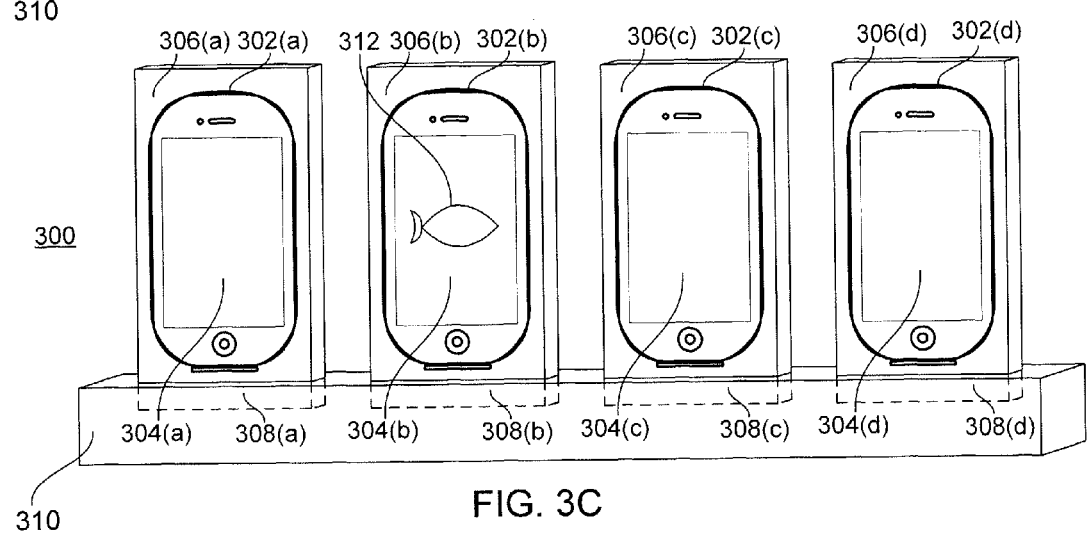

FIGS. 3A-3C are simplified perspective views of a video unit array 300 with video units 302(a)-(d) playing video content in a synchronized manner according to an embodiment of the invention. Video units 302(a)-(d) can include a storage medium (not shown) for storing video content to be displayed on display screens 304(a)-(d). For example, video units 302(a)-(d) can store software (and include hardware) for displaying a moving image 312 sequentially on display screens 304(a)-(d). To illustrate, at a first moment in time, as illustrated in FIG. 3A, moving image 312 can be displayed on display screen 304(a) of video unit 302(a). At a second moment in time, as illustrated in FIG. 3B, a portion of moving image 312 can appear on display screen 304(a) of video unit 302(a), and another portion of moving image 312 can appear on display screen 304(b) of video unit 302(b). At a third moment in time, as illustrated in FIG. 3C, moving image 312 can be entirely displayed on display screen 304(b) of video unit 302(b).

The sequential displaying of moving image 312 on display screen 304(a) and display screen 304(b) can appear to an observer that the moving image 312 is "moving" from display screen 304(a) to display screen 304(b). Such smooth and seamless transition from one video unit to another may require temporal synchronization amongst the video units. Temporal synchronization can be accomplished in a number of different ways. In one embodiment of the invention, a video unit can be a master video unit that provides temporal data to the other video units in the array. For example, video unit 302(a) can be a master video unit that provides temporal data to video units 302(b)-(d). Periodically, video units 302(b)-(d) may request temporal data from master video unit 302(a), and in response, master video unit 302(a) can transmit the temporal data to video units 302(b)-(d). Video units 302(b)-(d) can then synchronize temporally with master video unit 302(a). Temporal synchronization is discussed in further detail below with respect to FIG. 7.

Spatial synchronization may also be required to create the effect of images moving from one display screen to another. In order to synchronize spatially, video units 302(a)-(d) may determine their specific location on base unit 310 (i.e. determine the recesses 308(a)-(d) in which each of video units 302(a)-(d) are positioned). Determining base unit location can be accomplished in a number of different ways, as described in further detail below with respect to FIG. 8.

In other embodiments of the invention, video units 302(a)-(d) in video array 300 can play identical video content in a synchronized manner. As described above, temporal synchronization can be accomplished in a number of ways. For example, to maintain temporal synchronization amongst the video content played on display screens 304(a)-(d), a video unit can be a master unit that provides temporal data to the other video units in video array 300. To illustrate, video unit 302(b) can be a master video unit that provides temporal data to video units 302(a) and 302(c)-(d). Periodically, video units 302(a) and 302(c)-(d) may request temporal data from master video unit 302(b), and in response, master video unit 302(b) can transmit the temporal data to video units 302(a) and 302(c)-(d). Video units 302(a) and 302(c)-(d) can then synchronize temporally with master video unit 302(b). Such temporal synchronization can allow for identical content to be played on display screens 304(a)-(d) simultaneously, thus creating a unified experience for an observer.

In some embodiments of the invention, video content stored on the video units can be played in an endless loop. To illustrate, the video units can play video content that is 10 seconds long, and after playing for 10 seconds, the video content can be restarted. Alternatively, after playing for 10 seconds, the video units can play different video content that is synchronized across each of the video units in the array.

Figure 4A:
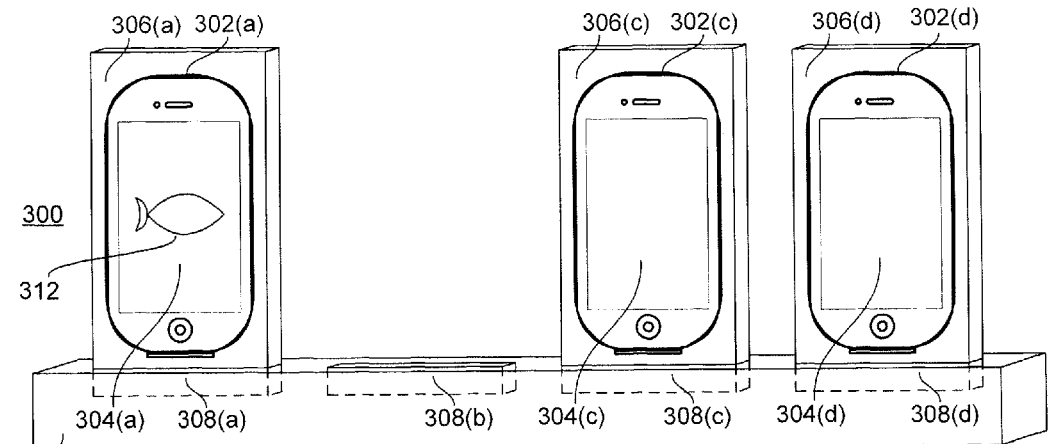
FIGS. 4A-4C are simplified perspective views of a video unit array 300 playing video content in a synchronized manner according to another embodiment of the invention.
Figure 4B:
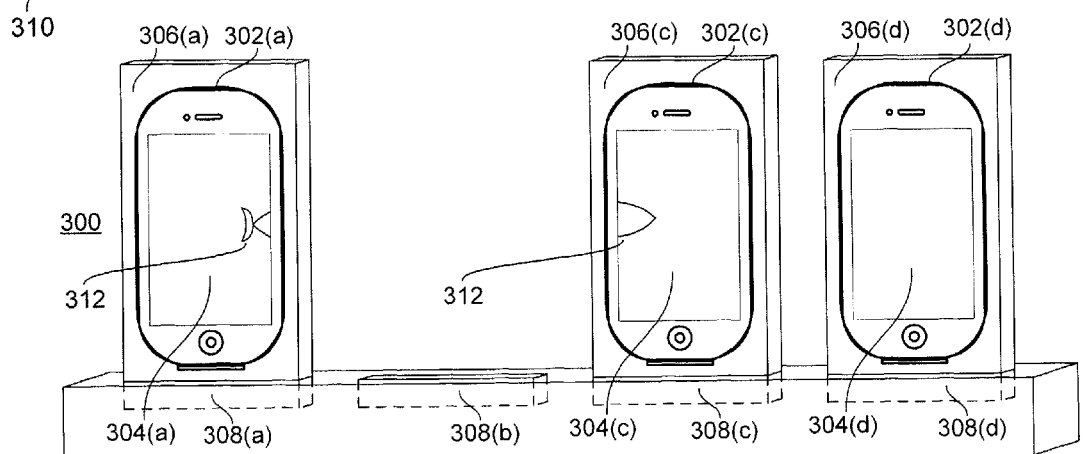
Figure 4C:
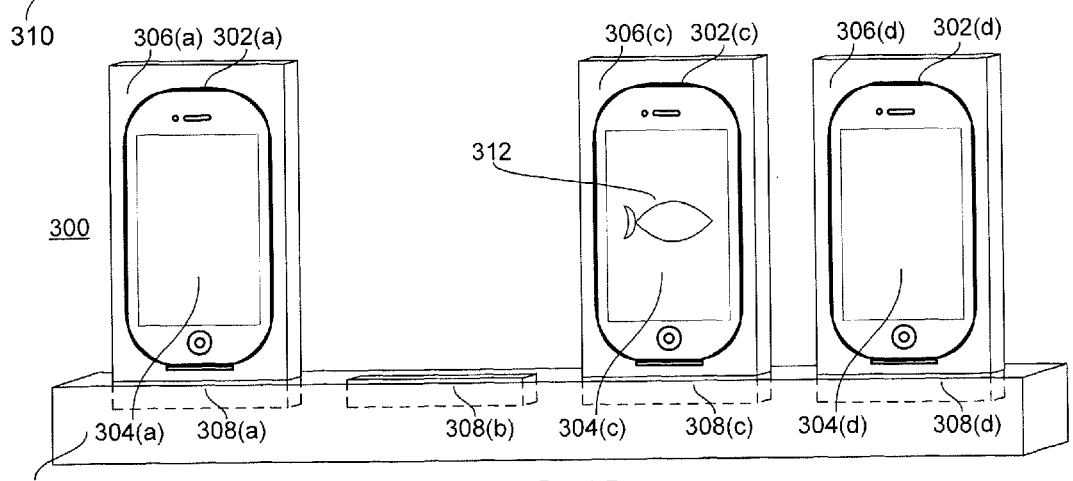

FIGS. 4A-4C are simplified perspective views of video unit array 300 playing video content in a synchronized manner according to another embodiment of the invention. Video unit array 300 is the same as video unit array 300 shown in FIGS. 3A-3C, except that in FIGS. 4A-4C, video unit 302(b) has been removed. In response to removal of video unit 302(b), video units 302(a) and 302(c)-(d) can adjust the video content played on display screens 304(a) and 304(c)-(d) to maintain temporal and spatial synchronization. To illustrate, at a first moment in time, as illustrated in FIG. 4A, moving image 312 can be displayed on display screen 304(a) of video unit 302(a). At a second moment in time, as illustrated in FIG. 4B, a portion of moving image 312 can appear on display screen 304(a) of video unit 302(a), and another portion of moving image 312 can appear on display screen 304(c) of video unit 302(c). At a third moment in time, as illustrated in FIG. 3C, moving image 312 can be entirely displayed on display screen 304(c) of video unit 302(c).

In another embodiment of the invention, video units 302(a) and 302(c)-(d) can play identical video content in a synchronized manner before and after video unit 302(b) is removed from video unit array 300.

In yet another embodiment of the invention, video units 302(a)-(d) can adjust the video content played on display screens 304(a)-(d) depending on how many video units remain in the array. For example, if video units 302(a)-(d) are all positioned in base unit 310, a first video content can be played on display screens 304(a)-(d). If video unit 302(b) is removed, video units 302(a) and 302(c)-(d) can play a second video content on display screens 304(a) and 304(c)-(d). If video unit 302(a) is then removed, video units 302(c)-(d) can play a third video content on display screens 304(c)-(d). Lastly, if video unit 302(c) or 302(d) is then removed, the video unit remaining in the array can play a fourth video content on its display screen.

To adjust the video content played on display screens 304(a) and 304(c)-(d) in response to the removal of video unit 302(b), video units 302(a) and 302(c)-(d) can detect that video unit 302(b) has been removed. Detecting when a video unit has been removed from video unit array 300 can be accomplished in a number of different ways. To illustrate, video unit 302(b) can be removed from recess 308(b) in base unit 310. Once removed, video unit 302(b) may no longer be receiving power from base unit 310. As a result, base unit 310 may detect a decrease in voltage indicating that video unit 302(b) has been removed. Base unit 310 can then transmit a message to video units 302(a) and 302(c)-(d) indicating that video unit 302(b) has been removed from base unit 310. The message can be transmitted using Bluetooth, IEEE 802.11 (e.g., WiFi), or any other suitable means of electronic communication. Once the message is received, video units 302(a) and 302(c)-(d) can synchronize (temporally and spatially) the displayed video content to account for the absence of video unit 302(b). If, for example, video unit 302(a) is a master video unit, video units 302(c)-(d) can periodically request temporal data from video unit 302(a) to maintain temporal synchronization (as described in further detail below) until video unit 302(b) is returned to recess 308(b). Once returned, base unit 310 can detect an increase in voltage indicating that video unit 302(b) has been returned. Base unit 310 can then transmit a message to video units 302(a) and 302(c)-(d) indicating that video unit 302(b) has been re-positioned in recess 308(b). Video units 302(a)-(d) can then play synchronized video content as illustrated in FIGS. 3A-3C, and as described above.

In another embodiment of the invention, detecting when a video unit has been removed from video unit array 300 can be accomplished through communication between a removed video unit with the video units remaining in the array. To illustrate, video unit 302(b) can be removed from recess 308(b) in base unit 310. Video unit 302(b) can detect that it has been removed, as described below with respect to FIGS. 5A-5C. In response to detecting its removal, video unit 302(b) can transmit a message to video units 302(a) and 302(c)-(d) indicating that it has been removed from base unit 310. The message can be transmitted using Bluetooth, IEEE 802.11 (e.g., WiFi), or any other suitable means of electronic communication. Once the message is received, video units 302(a) and 302(c)-(d) can synchronize (temporally and spatially) the displayed video content to account for the absence of video unit 302(b). Once returned to video unit array 300, video unit 302(b) can transmit another message to video units 302(a) and 302(c)-(d) indicating that it has been returned. Video units 302(a)-(d) can then play synchronized video content as illustrated in FIGS. 3A-3C, and as described above.

Figure 5A:
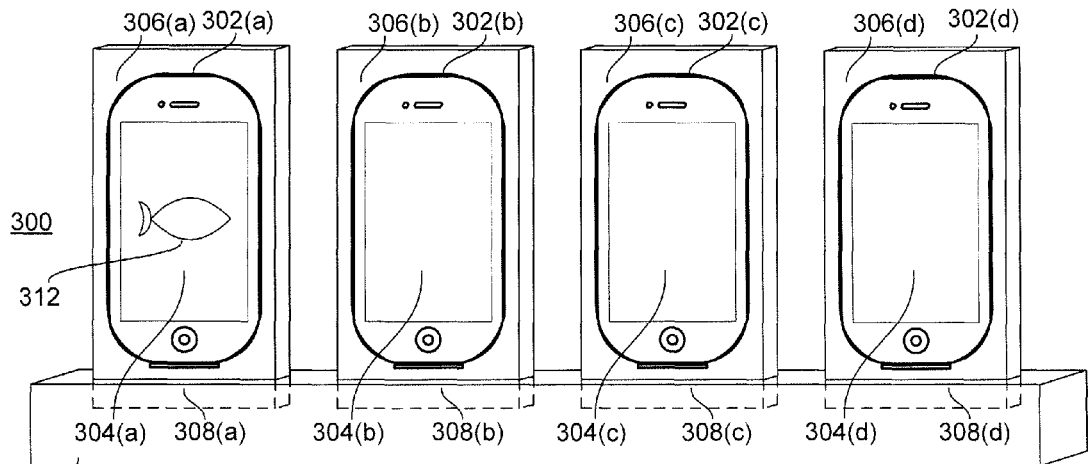
FIGS. 5A-5C are simplified perspective views of a video unit array 300 with a video unit 302(b) removed from the array playing video content that is specific to the video unit and not synchronized with the video content played on the video units 302(a) and 302(c)-(d) remaining in the array according to an embodiment of the invention.
Figure 5B:
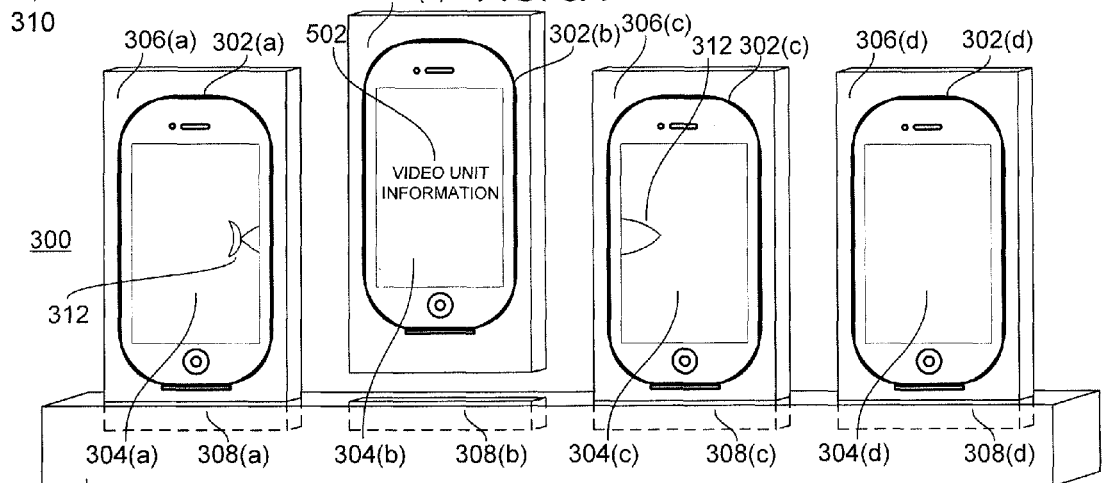
Figure 5C:
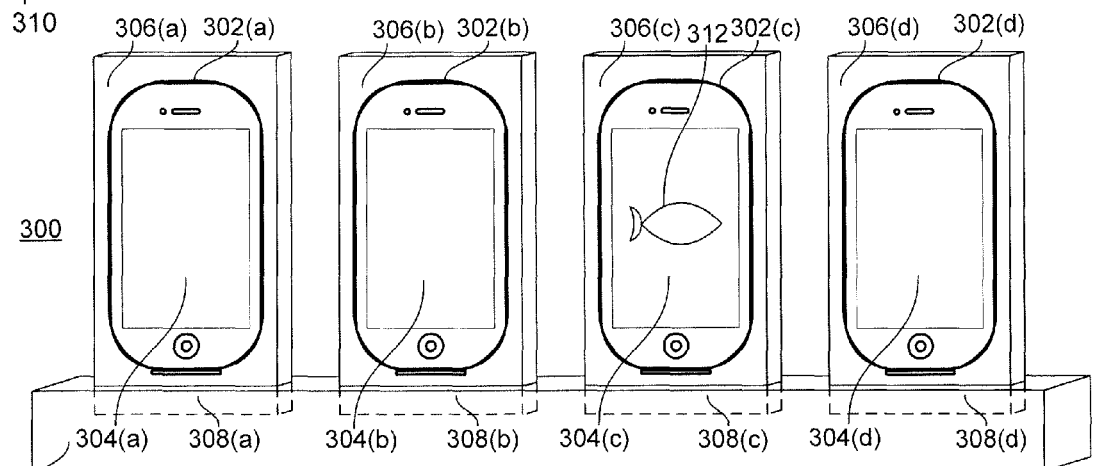

FIGS. 5A-5C are simplified perspective views of a video unit array 300 with a video unit 302(b) removed from the array playing video content 502 that is specific to the video unit and not synchronized with the video content played on video units 302(a) and 302(c)-(d) remaining in the array according to an embodiment of the invention. Upon removal from base unit 310, each of video units 302(a)-(d) can detect that they are no longer part of video unit array 300 and can play specific video content. The video content specific to the removed video unit(s) can be different than the synchronized video content playing on the video units remaining in video unit array 300. To illustrate, at a first moment in time, as illustrated in FIG. 5A, video units 302(a)-(d) can be positioned in recesses 308(a)-(d), respectively. A moving image 312 can be displayed on display screen 304(a) of video unit 302(a). At a second moment in time, as illustrated in FIG. 5B, casings 306(b) suspending video unit 302(b) can be removed from recess 308(b) in base unit 310. Video unit 302(b) can detect that it has been removed from base unit 310, and in response, play video content 502 specific to video unit 302(b). For example, video content describing the features or capabilities of video unit 302(b) can be played on display screen 304(b). As described above, the video units remaining in base unit 310 (e.g., video units 302(a) and 302(c)-(d)) can detect the removal of video unit 302(b). Video content played on video units 302(a) and 302(c)-(d) can then be adjusted to maintain temporal and spatial synchronization, as described above. For example, a portion of moving image 312 can appear on display screen 304(a) of video unit 302(a), and another portion of moving image 312 can appear on display screen 304(c) of video unit 302(c). At a third moment in time, as illustrated in FIG. 5C, video unit 302(b) can be returned to base unit 310 by being re-positioned in recess 308(b). Video unit 302(b), in addition to video units 302(a) and 302(c)-(d), can detect that it has been re-positioned in recess 308(b) of base unit 310. In response to detecting the return of video unit 302(b), the video content played on display screens 304(a)-(d) of video units 302(a)-(d) can be re-synchronized temporally and spatially, as described above.

As seen in FIG. 5B, the video content 502 played on display screen 304(b) of video unit 302(b) can be specific to video unit 302(b) and not synchronized with video units 302(a) and 302(c)-(d). To determine when to play video content 502 specific to video unit 302(b), video unit 302(b) can detect when it has been removed from base unit 310. This detection can be accomplished in a number of different ways. In one embodiment of the invention, video unit 302(b) no longer receives wireless power when removed from base unit 310. Upon detecting the loss of wireless power, video unit 302(b) may then play video content 502 on display screen 304(b). When video unit 302(b) is returned to base unit 310 by being re-positioned in recess 308(b), video unit 302(b) can detect that it is receiving wireless power from base unit 310, and then play video content in a synchronized manner with video units 302(a) and 302(c)-(d).

In another embodiment, video unit 302(b) (or casing 308(b)) can include an accelerometer capable of detecting the movement associated with removing video unit 302(b) from base unit 310. In response to detecting the removal of video unit 302(b), video content 502 can be played on display screen 304(b). When video unit 302(b) is returned to base unit 310, the accelerometer can detect the movement associated with re-positioning video unit 302(b) in recess 308(b) of base unit 310. In response to detecting the return of video unit 302(b) to base unit 310, the video content played on display screen 304(b) can be re-synchronized with video units 302(a) and 302(c)-(d).

In embodiments of the invention, an accelerometer can also be used to create various visual effects. For example, video unit 302(b) can include software to create visual effects when video unit 302(b) is removed from or returned to base unit 310. In one embodiment, the video content played on display screen 304(b) at the time of removal or return can be adjusted to appear to an observer as if the video content is "falling off" display screen 304(b). Any other suitable visual effects making use of an accelerometer can be displayed on display screens 304(a)-(d).

As described above, a video unit can detect when it has been removed from base unit 310 using a number of different methods, including detecting the loss of wireless power and using an accelerometer to detect the movement associate with removing a video unit from base unit 310. As also described above, a video unit can detect that it is currently positioned on base unit 310 using similar methods. Additionally, a video unit that is currently positioned on base unit 310 can detect that other video units are also positioned on base unit 310 in a number of different ways. For example, in an embodiment of the invention, video units 302(a)-(d) can broadcast a message indicating that each unit is positioned on base unit 310. To illustrate, video units 302(b)-(d) can broadcast a message indicating that they are positioned on base unit 310, and this message can be received by video unit 302(a). Upon receipt, video unit 302(a) will be informed that video units 302(b)-(d) are also positioned on base unit 310, and that video unit 302(a) is part of a video unit array (e.g., video unit array 300) that also includes video units 302(b)-(d).

Figure 6:
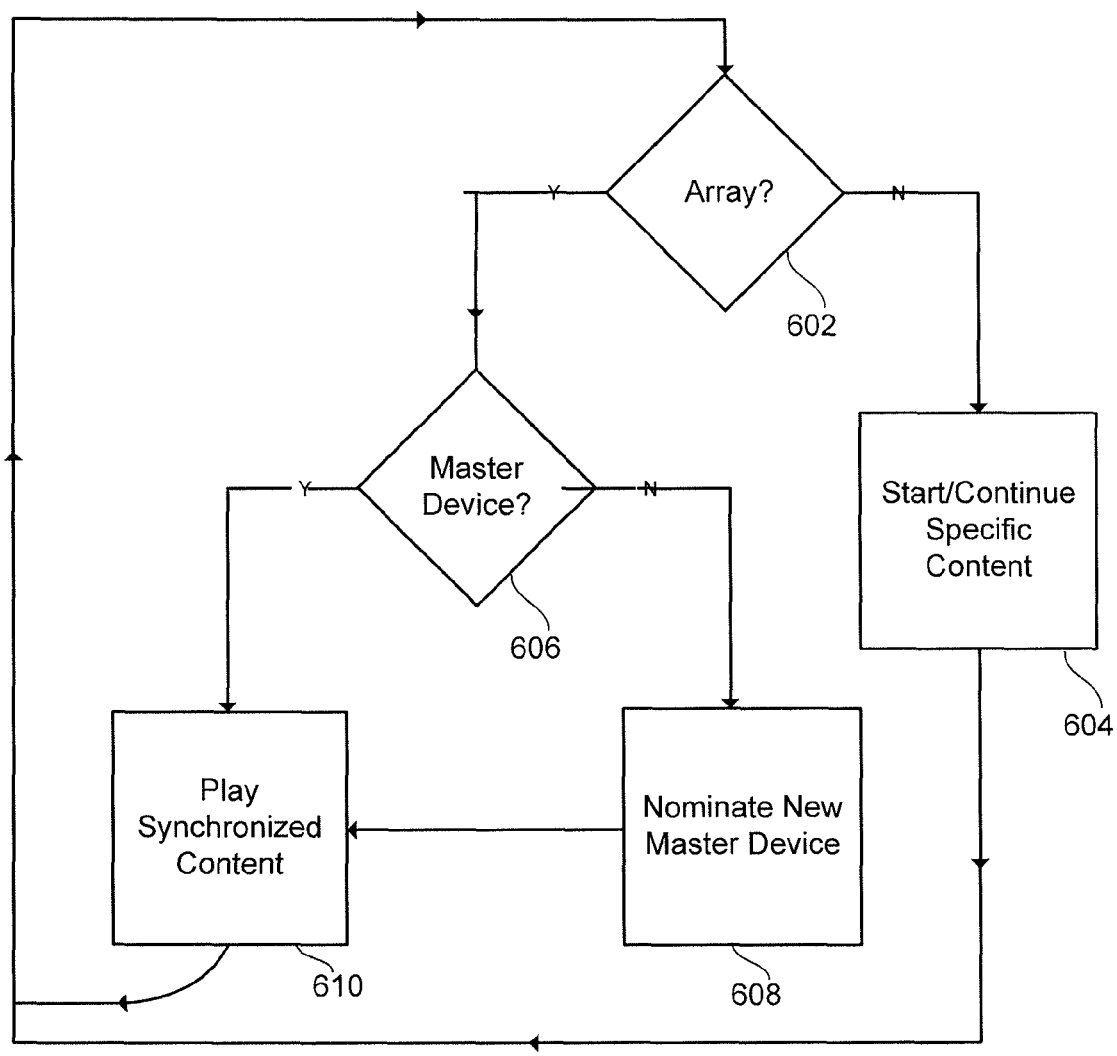
FIG. 6 is a flow diagram of a process 600 usable by a video unit to play synchronized and specific video content according to an embodiment of the invention.

FIG. 6 is a flow diagram of a process 600 usable by a video unit to play synchronized and specific video content according to an embodiment of the invention. Process 600 can be performed by any of the video units illustrated in FIGS. 1-5C.

At decision 602, video unit 302(b), for example, can continuously or periodically determine whether it is part of video unit array 300. As described above, determining whether a video unit is part of a video unit array can be accomplished in a number of different ways. For example, video unit 302(b) can periodically determine whether it is receiving wireless power from base unit 310 (e.g., whether it is currently positioned in recess 308(b) of base unit 310). If video unit 302(b) is receiving wireless power, this can indicate to video unit 302(b) that it is part of video unit array 300. In another embodiment, as described above, video unit 302(b) can utilize accelerometer data to determine whether it is currently located on base unit 310 and part of video unit array 300.

If at decision 602, video unit 302(b) determines that it is currently not part of video unit array 300 (e.g., that it has been removed from recess 308(b) of base unit 310), the process can proceed to block 604.

At block 604, video unit 302(b) can start or continue to play video content 502 specific to video unit 302(b) and not synchronized with the video content played on display screens 304(a) and 304(c)-(d) of video units 302(a) and 302(c)-(d). For example, if video unit 302(b) was previously part of video unit array 300 and playing video content synchronized with video units 302(a) and 302(c)-(d), video unit 302(b) can start to play video content 502 specific to video unit 302(b) and not synchronized with the video content played on video units 302(a) and 302(c)-(d). Alternatively, if video unit 302(b) was previously playing video content 502 specific to video unit 302(b), it can continue to play video content 502. As such, video unit 302(b) can play video content 502 continuously until it is returned to base unit 310 and it determines that it is once again part of video unit array 300.

If at decision 602, video unit 302(b) determines that it is currently part of video unit array 300 (e.g., that it is positioned in recess 308(b) of base unit 310), the process can proceed to decision 606.

At decision 606, video unit 302(b) can determine whether there is a master video unit currently positioned on base unit 310. A master video unit can continuously or periodically communicate with the other video units positioned on base unit 310 using Bluetooth, IEEE 802.11 (e.g., WiFi), or any other suitable means of electronic communication to inform the other video units that it is the master video unit.

If at decision 606, video unit 302(b) determines that there is a master video unit currently positioned on base unit 310, the process can proceed to block 610. For example, video unit 302(b) may receive an indication from video unit 302(a) that it is the master video unit, and then proceed to block 610.

At block 610, video unit 302(b) can communicate with master video unit 302(a) to play video content in a synchronized manner. Synchronization with a master video unit, according to one embodiment of the invention, is described in further detail below with respect to FIG. 7.

If at decision 606, video unit 302(b) determines that there is no master unit currently positioned on base unit 310, the process can proceed to block 608. For example, video unit 302(b) may not receive an indication within a specific period of time (e.g., ten milliseconds) from another video unit that there is a master video unit currently positioned on base unit 310, and then proceed to block 608.

At block 608, a new master video unit can be nominated or selected from the video units currently positioned on base unit 310. The selection process can be accomplished in a number of different ways. In one embodiment of the invention, video units 302(a)-(d) may each be associated with a unique identifier. For example, each video unit may be assigned a UUID which is a 128 bit global unique identifier specific to hardware included in each video unit. Each video unit positioned on base unit 310 can broadcast their unique identifier using Bluetooth, IEEE 802.11 (e.g., WiFi), or any other suitable means of electronic communication to the other video units positioned on base unit 310. In an embodiment of the invention, the video unit with the lowest value unique identifier can be selected to be the master video unit. Alternatively, the video unit with the highest value unique identifier can be selected to be the master video unit.

Once a master video unit is selected, the process can proceed to block 610. For example, if video unit 302(c) is selected to be the master video unit, then video units 302(a)-(b) and 302(d) can communicate with master video unit 302(c) to play video content in a synchronized manner.

Figure 7:
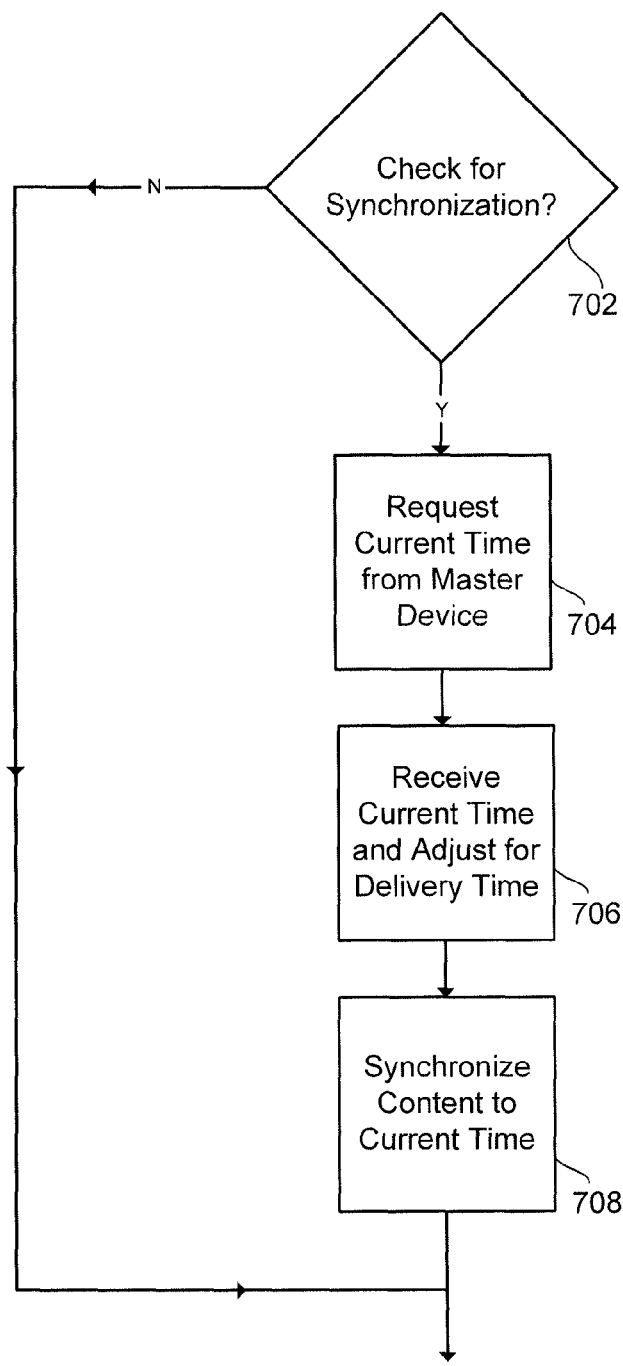
FIG. 7 is a flow diagram of a process 700 usable by a video unit to synchronize video content according to an embodiment of the invention.

FIG. 7 is a flow diagram of a process 700 usable by a video unit to synchronize video content according to an embodiment of the invention (i.e. block 610 in process 600). Process 700 can be performed by any of the video units illustrated in FIGS. 1-5C.

At decision 702, video unit 302(b), for example, can continuously or periodically determine whether it must check for synchronization with the master video device. For example, video unit 302(b) may check for synchronization with master video unit 302(c) once every second. Each time video unit 302(b) checks for synchronization with master video unit 302(c), it can create a time stamp indicating when the check was conducted. If more than one second has passed since video unit 302(b) has checked for synchronization with master video unit 302(c), the process can proceed to block 704.

At block 704, video unit 302(b) can transmit a message to master video unit 302(c) requesting the current time. This message can be transmitted using Bluetooth, IEEE 802.11

(e.g., WiFi), or any other suitable means of electronic communication. Upon transmitting the request for current time to master video unit 302(c), video unit 302(b) can create a time stamp indicating the time at which the request was sent, and the process can proceed to block 706.

At block 706, video unit 302(b) can receive a message including the current time from master video unit 302(c). The message can be transmitted using Bluetooth, IEEE 802.11 (e.g., WiFi), or any other suitable means of electronic communication. Once received, video unit can adjust the current time transmitted from master video unit 302(c) to account for message travel time. In one embodiment of the invention, video unit 302(b) can approximate message travel time by dividing the time that passed between sending the request (e.g., when the time stamp was created) and receiving the current time by two. The approximate message travel time can be added to the current time as transmitted from master video unit 302(c), and video unit 302(b) can proceed to block 708. In some embodiments of the invention, if the time that passes between video unit 302(b) sending the request and receiving the current time from master video unit 302(c) is greater than some threshold value, video unit 302(b) can disregard the temporal data received from master video unit 302(c). Video unit 302(b) can then proceed to block 708 assuming the previous synchronized time (e.g., the most recent current adjusted time) further adjusted for any time that has passed since the last synchronization as determined independently by video unit 302(b).

At block 708, video unit 302(b) can temporally synchronize video content played on display screen 304(b) with the current time as received from master video unit 302(c) and as adjusted for approximate travel time. Synchronization can be accomplished in a number of different ways depending on the time experienced by video unit 302(b). For example, if video unit 302(b) is "behind" the current adjusted time, the video content played on displayed screen 304(b) can be "sped up" for a determined period of time to smoothly synchronize with master video unit 304(c). In other words, the video content played on display screen 304(b) can be played at an increased rate (e.g., 1.5, 2, or 3 times the normal rate) until it is temporally synchronized with the current adjusted time. If video unit 302(b) is "ahead" of the current adjusted time, the video content played on display screen 304(b) can be "slowed down" for a determined period of time. In other words, the video content played on display screen 304(b) can be played at a decreased rate (e.g., 0.75, 0.5, or 0.33 times the normal rate) until it is temporally synchronized with the current adjusted time. If, for example, video unit 302(b) is ahead or behind the current adjusted time by a threshold value, the video content played on display screen 304(b) can be immediately adjusted to synchronize with master video unit 302(c). For example, the video content played on display screen 304(b) can be skipped immediately to the correct temporal synchronization point. During temporal synchronization, video unit 302(b) can also add or subtract an additional time increment (e.g., an offset) to account for any delay associated with processing the synchronization algorithm.

In embodiments of the invention, as described above, video units 302(a)-(b) may be configured to provide audio content in addition to video content. At block 708, when the video content is slowed down, sped up, or immediately adjusted during the temporal synchronization process, audio content can also be synchronized in a number of different ways. For example, an audio content filtering process (e.g., vari-speed filtering) can be utilized to speed up or slow down the audio content without changing the pitch to provide for smooth synchronization of the audio content.

As discussed above with respect to FIGS. 3A-3C, spatial synchronization, in addition to temporal synchronization, can be used to create the effect of images moving from one display screen to another. In order to synchronize spatially, video units 302(a)-(d) can each determine their specific location in base unit 310 (i.e. determine the recesses 308(a)-(d) on base unit 310 in which each of video units 302(a)-(d) are positioned).

Figure 8:
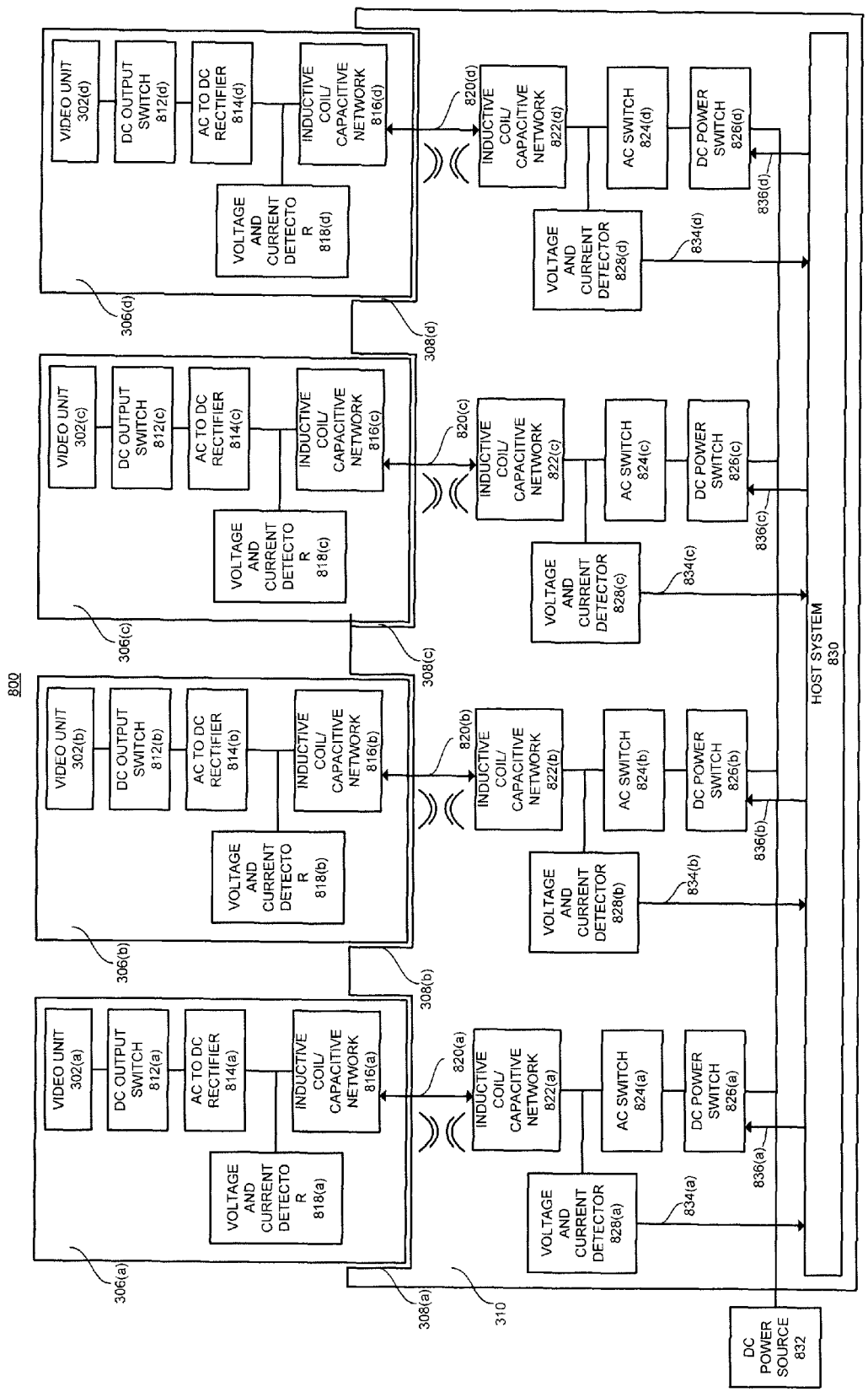
FIG. 8 is a simplified block diagram 800 of hardware included in video units 302(a)-(d) and base station 310 for determining base unit location of video units 302(a)-(d) according to an embodiment of the invention.

FIG. 8 is a simplified block diagram of hardware included in video units 302(a)-(d) and base station 310 for determining base unit location of video units 302(a)-(d) according to one embodiment of the invention. As seen in FIG. 8, casings 306(a)-(d) suspending video units 302(a)-(d) can include DC output switches 812(a)-(d), AC to DC rectifiers 814(a)-(d), inductive coils/capacitive networks 816(a)-(d), and voltage and current detectors 818(a)-(d). Base unit 310 including recesses 308(a)-(d) can also include inductive coils/capacitive network 822(a)-(d), AC switches 824(a)-(d), DC power switches 826(a)-(d), voltage and current detectors 828(a)-(d), and a host system 830. Base unit 310 can also be electronically coupled to a DC power source 832.

Determining base unit location can be accomplished in a number of different ways. In some embodiments of the invention, base unit location can be determined by manipulating the power signal delivered wirelessly to video units 302(a)-(d). For example, the power signal received from the DC power source 832 can be modulated by a modulator in the host system 830. The modulated signal, as provided by the host system 830, can encode data describing base unit locations that correspond to recesses 308(a)-(d) in which video units 302(a)-(d) can be positioned. The modulated signal can be transmitted wirelessly from inductive coil/capacitive network 822(a) included in base unit 310 to inductive coils/capacitive networks 816(a)-(d) included in casings 306(a)-(d) over communication channels 820(a)-(d). Casings 306(a)-(d) can each include a demodulator (not shown) for decoding the encoded data describing base unit locations as carried by the modulated power signal. Once decoded, the data describing base unit locations can be transmitted to video units 302(a)-(d), which can then synchronize spatially with a master video unit in video unit array 300.

In another embodiment of the invention, base unit location can be determined by toggling the power load at the receiving side of the wireless power signal. To illustrate, DC output switches 812(a) in casing 306(a) can cut off the power being delivered to video unit 302(a). When power delivery is cut off, voltage and current detector 828(a) may experience a decrease in voltage and current. Host system 830 can detect the decrease in voltage and current by receipt of a detect signal 834(a) transmitted by voltage and current detector 828(a). In response to receiving detect signal 834(a), host system 830 can transmit a message identifying base unit location to video unit 302(a) indicating that video unit 302(a) is positioned in recess 308(a). The message identifying base unit location can be transmitted using Bluetooth, IEEE 802.11 (e.g., WiFi), or any other suitable means of electronic communication.

In another embodiment of the invention, base unit location can be determined by toggling the power load at the transmission side of the wireless power signal. To illustrate, host system 830 can send control signals 836(a)-(d) to DC power switches 826(a)-(d) in base unit 310. The control signals 836(a)-(d) can cause the DC power switches 826(a)-(d) to toggle power on and off in a unique pattern to video units 302(a)-(d). For example, the power signal can be toggled in a unique sequence such as 0111 to video unit 302(a), 1011 to video unit 302(b), 1101 to video unit 302(c), and 1110 to video unit 302(d). Host system 830 can time stamp each power toggling event. Voltage and current detectors 818(a)-(d) included in casings 306(a)-(d) can detect the unique power toggle patterns, and video units 302(a)-(d) can timestamp the time at which power toggling is detected. Video units 302(a)-(d) can then transmit a message to host system 830 including the power toggle pattern and the time at which the power toggle was detected. Host system 830 can then match the power toggle patterns and time stamps, and transmit a message to video units 302(a)-(d) indicating that video units 302(a)-(d) are positioned in recesses 308(a)-(d), respectively. Host system 830 and video units 302(a)-(d) can communicate using Bluetooth, IEEE 802.11 (e.g., WiFi), or any other suitable means of electronic communication.

In another embodiment of the invention, determining base unit location can be accomplished using radio-frequency identification (RFID). Base unit 310 can include an RFID tag at each base unit location. The RFID tags can include position data identify each base unit location in base unit 310, and can be passive, active, or battery assisted passive. The casings 306(a)-(d) suspending video units 302(a)-(d) can include a reader component (not shown) for reading the position data from the RFID tags (via radio waves), and can include hardware to transmit to video units 302(a)-(d) the location at which each video unit is positioned on base unit 310.

It should be noted that in FIG. 8, any of DC output switches 812(a)-(d), AC to DC rectifiers 814(a)-(d), voltage and current detectors 818(a)-(d), and inductive coils/capacitive networks 816(a)-(d) can be included in video units 302(a)-(d) instead of casings 306(a)-(d). Additionally, any of DC power switches 826(a)-(d), AC switches 824(a)-(d), inductive coils/capacitive networks 822(a)-(d), voltage and current detectors 828(a)-(d), and host system 830 can be located external to base unit 310.

It should also be noted that in other embodiments of the invention, a remote unit (e.g., a remote video unit, server computer, etc.) not positioned on base unit 310 can act as a master device. For example, a server computer capable of communicating with video units 302(a)-(d) via IEEE 802.11 (e.g., WiFi) can perform some or all of the functions of a master video unit as described herein. In some embodiments, synchronization can be accomplished using infrared (IR) or ambient light sensing. A beacon can be placed in the vicinity of base unit 310 that transmits a synchronization signal that can be detected by a camera or proximity sensor included in video units 302(a)-(d). Additionally, the video content played on display screens 304(a)-(d) can be stored remotely instead of on the storage medium included in video units 302(a)-(d). For example, video content can be stored on a remote server and streamed to video units 302(a)-(d) over a network using IEEE 802.11 (e.g., WiFi), for example. The remote server may also be capable of transmitting personalized video content specific to an observer to be played on a video unit when removed from base unit 310 by the observer.

As will be understood by those skilled in the art, the present invention may be embodied in other specific forms without departing from the essential characteristics thereof. Various configurations described herein may be combined without departing from the present invention. The above described embodiments of the present invention are presented for purposes of illustration and not of limitation. The present invention also can take many forms other than those explicitly described herein. Those skilled in the art will recognize, or be able to ascertain, using no more than routine experimentation, many equivalents to the specific embodiments of the invention described herein. Accordingly, it is emphasized that the invention is not limited to the explicitly disclosed methods, systems and apparatuses, but is intended to include variations to and modifications thereof which are intended to be encompassed by the following claims.

What is claimed is:

1. A method for displaying video content on a plurality of video units in an array, comprising:
    synchronizing the video content displayed across the plurality of video units in the array;
    detecting whether a video unit of the plurality of video units has been removed from the array, wherein detecting whether the video unit has been removed comprises receiving a wireless message from the video unit indicating that the video unit has been removed from the array; and
    in response to receiving the wireless message indicating that the video unit has been removed from the array, synchronizing the video content displayed across the plurality of video units remaining in the array.

2. The method of claim 1 wherein the video content is stored on the plurality of video units.

3. The method of claim 1 wherein the plurality of video units are wirelessly powered.

4. The method of claim 1 wherein the plurality of video units comprises a master video unit.

5. The method of claim 4 wherein synchronizing the video content displayed across the plurality of video units in the array comprises synchronizing the plurality of video units temporally with the master video unit.

6. The method of claim 4 further comprising:
    determining whether the master video unit has been removed from the array; and
    in response to determining that the master video unit has been removed from the array, selecting a master video unit from the plurality of video units remaining in the array.

7. The method of claim 1 further comprising:
    determining the position of each video unit remaining in the array.

8. The method of claim 1 wherein synchronizing the video content displayed across the plurality of video units further comprises synchronizing the video content displayed across the plurality of video units such that the video content moves sequentially from a video unit in the array to an adjacent video unit in the array.

9. The method of claim 1, wherein detecting whether a video unit of the plurality of video units has been removed from the array comprises detecting a decrease in voltage.

10. The method of claim 1, wherein transmitting the message to the video units remaining in the array comprises transmitting a message to the video units remaining in the array to indicate that the video unit has been removed from array.

11. A method for displaying video content on a video unit that is part of an array of video units, comprising:
    detecting whether the video unit has been removed from the array of video units, wherein the array of video units plays video content in a synchronized manner;
    in response to detecting that the video unit has been removed from the array of video units, wirelessly transmitting information to the video units remaining in the array; and
    in response to detecting that the video unit has been removed from the array of video units, playing video content on the video unit that is specific to the video unit and is not synchronized with the video content played on the video units remaining in the array.

12. The method of claim 11 wherein the video content specific to the video unit is stored on the video unit.

13. The method of claim 11 wherein the array of video units are wirelessly powered.

14. The method of claim 13 wherein detecting that the video unit is removed from the array of video units further comprises determining that the removed video unit is not receiving wireless power.

15. The method of claim 11 further comprising:
   detecting that the removed video unit has been returned to the array of video units; and
   playing video content on the returned video unit in a synchronized manner with the array of video units.

16. The method of claim 15, wherein detecting that the removed video unit has been returned to the array of video units comprises detecting an increase in voltage.

17. A video unit comprising:
   a display screen;
   a processor; and
   a memory, wherein the memory is programmed to carry out a method comprising:
      detecting that the video unit is removed from an array of video units playing video content in synchronized manner;
      in response to detecting that the video unit is removed from the array of video units, wirelessly transmitting information to the video units remaining in the array; and
      in response to detecting, playing video content on the display screen that is specific to the video unit and is not synchronized with the video content played on the video units remaining in the array.

18. The video unit of claim 17 wherein the video content specific to the video unit is stored on the video unit.

19. The video unit of claim 17 wherein the video unit is wirelessly powered.

20. The video unit of claim 17 wherein detecting that the video unit is removed from the video unit further comprises detecting that the video unit is not receiving wireless power.

21. The video unit of claim 17, wherein wirelessly transmitting information to the video units remaining in the array comprises wirelessly transmitting a message to the video units remaining in the array to indicate that the video unit has been removed from the array.

22. A first video unit, wherein the first video unit is part of an array of video units that plays video content in a synchronized manner, comprising:
   a display screen that displays video content;
   a processor; and
   a memory, wherein the memory is programmed to carry out a method comprising:
      receiving a wireless message from a second video unit indicating that the second video unit is removed from the array of video units playing video content in a synchronized manner; and
      in response to receiving the wireless message that the second video has been removed from the array of video units, adjusting the video content displayed on the display screen.

23. The first video unit of claim 22 wherein the method carried out by the memory further comprises:
   determining that there is a master video unit remaining in the array of video units;
   requesting temporal data from the master video unit;
   receiving temporal data from the master video unit; and
   playing video content on the display screen that is synchronized with the master video unit.

24. The first video unit of claim 22 wherein the method carried out by the memory further comprises:
   determining that the removed video unit is a master video unit, wherein the master video unit is a first master video unit;
   broadcasting an identifier unique to the first video unit;
   detecting that a second master video unit has been selected;
   requesting temporal data from the second master video unit;
   receiving temporal data from the second master video unit; and
   playing video content on the display screen that is synchronized with the second master video unit.

* * * * *